Oct. 6, 1931.  H. CHRISMAN  1,826,272
DEMAND METER
Filed Dec. 20, 1926  2 Sheets-Sheet 1

INVENTOR:
Horace Chrisman,
by A. R. Vencill
His Attorney

Oct. 6, 1931.   H. CHRISMAN   1,826,272
DEMAND METER
Filed Dec. 20, 1926   2 Sheets-Sheet 2

INVENTOR:
Horace Chrisman,
by A. R. Vencill
His Attorney

Patented Oct. 6, 1931

1,826,272

UNITED STATES PATENT OFFICE

HORACE CHRISMAN, OF SWISSVALE, PENNSYLVANIA, ASSIGNOR, BY MESNE ASSIGNMENTS, TO PITTSBURGH EQUITABLE METER COMPANY, OF PITTSBURGH, PENNSYLVANIA, A CORPORATION OF PENNSYLVANIA

DEMAND METER

Application filed December 20, 1926. Serial No. 155,903.

My invention relates to demand meters, that is, to meters or recorders of the type which makes a record of the rate of demand of a meterable commodity, such as gas, water or electricity, at different times of the day.

One object of my invention is the provision of an improved demand meter, and particularly an improved demand meter for use in recording the rate of demand of fluids such as gas and water. A further object of my invention is the provision, in demand meters, of novel and improved means for rotating the chart on which the demand record is made.

I will describe one form of meter embodying my invention, and will then point out the novel features thereof in claims.

Figure 1:
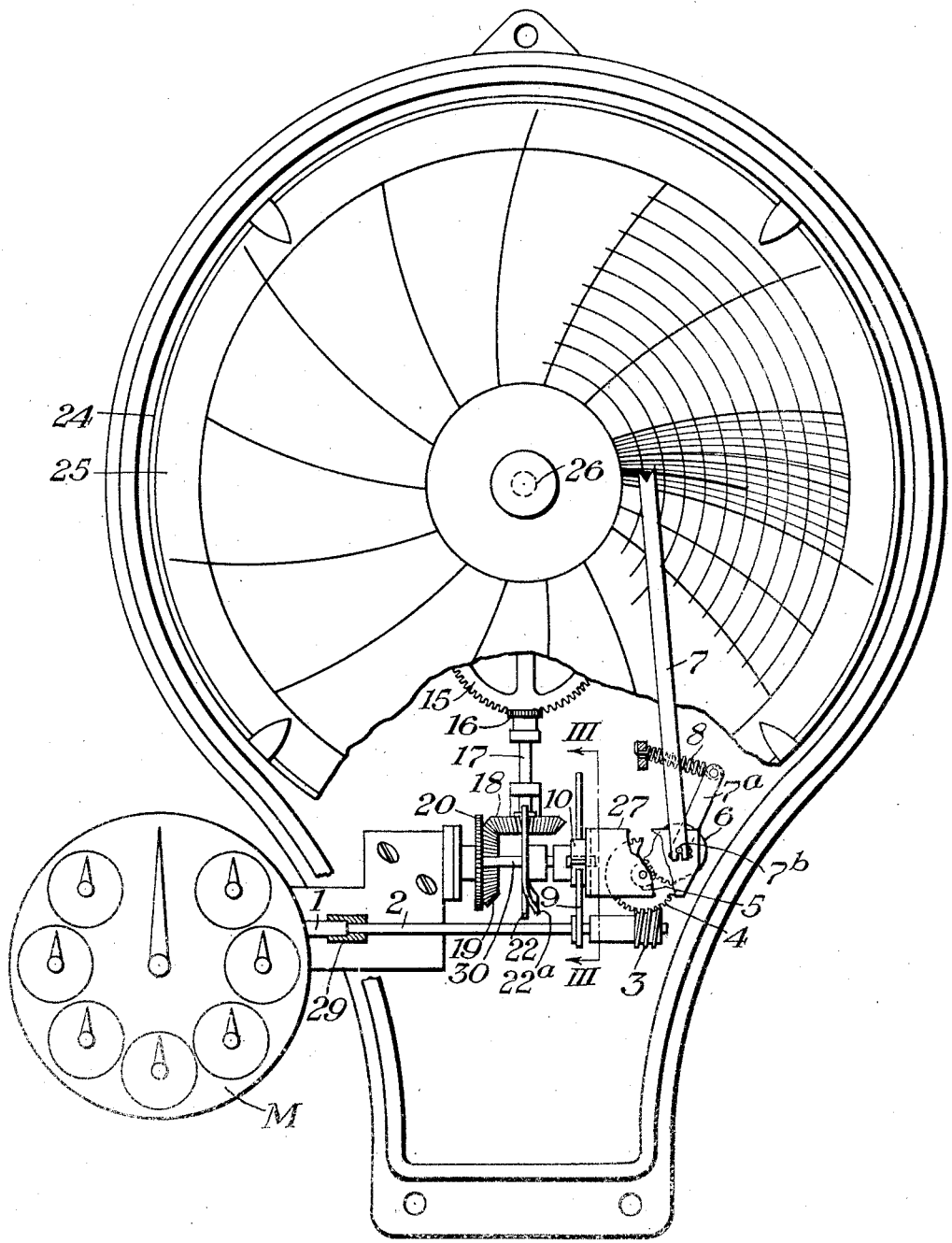
Figure 2:
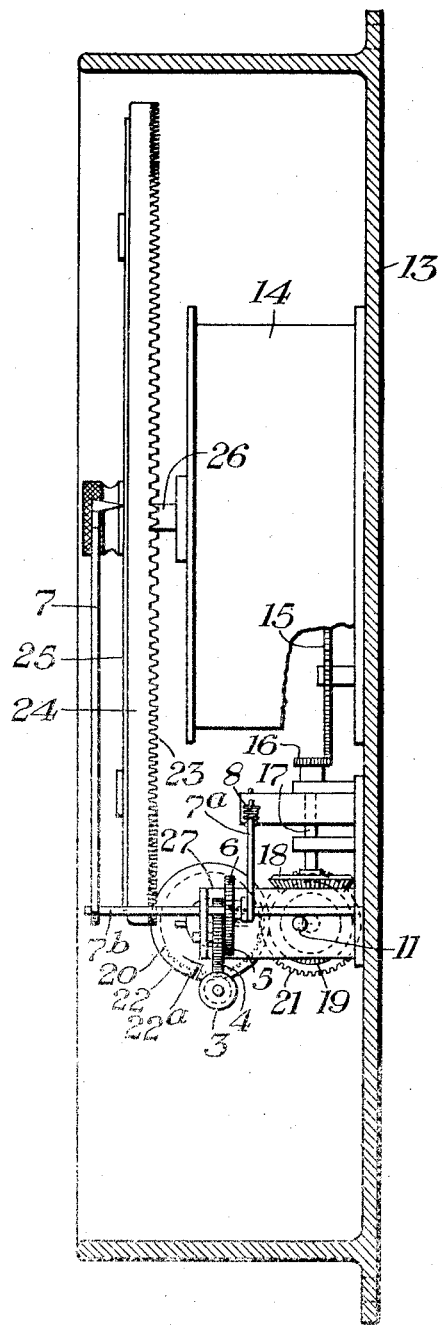
Figure 3:
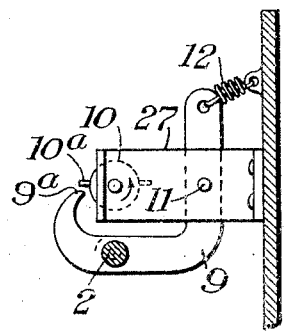

In the accompanying drawings, Fig. 1 is a view showing in front elevation, with parts broken away, one form of meter embodying my invention. Fig. 2 is a side view of the meter shown in Fig. 1, with the enclosing case sectioned. Fig. 3 is a sectional view on the line III—III of Fig. 1.

Similar reference characters refer to similar parts in each of the several views.

Referring first to Fig. 1, the reference character 1 designates a shaft which is rotated at a rate proportional to the flow of a meterable commodity, such as gas, water or electricity. For example, this shaft may be operated by a gas meter M of any suitable type. The shaft 1 is connected with a shaft 2 by means of a coupling 29, and fixed to the shaft 2 is a worm 3 which normally meshes with a gear wheel 4. Fixed to the gear wheel 4 is a pinion 5 which meshes with a segment gear 6, and the latter gear is in turn fixed to a shaft 7$^b$ which carries a stylus 7. It follows that while the worm 3 and the gear wheel 4 are in mesh, the stylus 7 is swung around the axis of the shaft 7$^b$ at an angular rate which is proportional to the rate of operation of the meter M. The stylus 7 co-operates with a chart 25 which is attached to a chart supporting plate 24 pivotally mounted on an axis 26 and turned around this axis by means hereinafter explained. The stylus 7 is biased to the zero position on the chart 25 by a spring 8 acting on an arm 7$^a$ which is fixed to the stylus shaft 7$^b$. The reason for making the gear 6 a segment gear is to prevent the stylus 7 being swung beyond the outer edge of the chart scale in the event of excessive rate of operation of the meter M.

The shaft 2 is journalled in a trip lever 9, which is pivotally mounted at point 11 in a block 27 attached to the case 13. The trip lever 9 is biased by a spring 12 to such position that the worm 3 is in mesh with the gear wheel 4, but when the trip lever 9 is swung in counter-clockwise direction, as viewed in Fig. 3, the shaft 2 is moved downwardly, as viewed in Fig. 1, so that the worm 3 is shifted out of mesh with gear wheel 4. This operation of the trip lever 9 is accomplished by a cam 10 comprising a disk provided with wings 10$^a$, which co-act with a lip 9$^a$ on the trip lever. The cam 10 is constantly rotated in the direction indicated by the arrow in Fig. 3, and, as here shown, this cam is provided with two wings 10$^a$, so that the worm 3 is moved into its disengaging position twice for each revolution of the cam. The cam 10 is fixed to a shaft 30 which is constantly rotated by a motor 14, usually a clockwork mechanism, suitably mounted in the case 13. This mechanism is connected with the shaft 30 by gearing of any suitable kind. As here shown, the mechanism 14 operates a gear 15, which meshes with a gear 16 attached to a shaft 17. Also attached to the shaft 17 is a bevel gear 18 meshing with a bevel gear 19, to which is fixed a gear wheel 21. Gear wheel 21 meshes with a gear wheel 20 which is fixed to the shaft 30.

Also fixed to the shaft 30 is a disk 22 the periphery of which is provided with at least one offset portion 22$^a$. Near the outer edge of the rear face of the chart plate 24 is a circular rack 23, and the periphery of the disk 22 lies between two teeth of this rack, so that the chart plate is advanced the angular distance of one tooth each time that the offset portion 22$^a$ of the disk 22 engages the rack. It follows that the chart plate will be advanced one or more teeth for each revolution of shaft 30 according as the disk 22 is provided with one or more offset portions 22$^a$.

The number of wings 10$^a$ on cam 10 must never be greater than the number of offset portions 22ª on disk 22, but there may be more offset portions 22ª on disk 22 than there are wings on cam 10.

The operation of the aparatus is as follows: As long as the motor 14 is in operation, the chart 25 is periodically advanced by the disk 22, and the stylus 7 is periodically disconnected from the shaft 2 by the cam 10. Each time that the stylus is released, it returns to the zero position on the chart and then moves from that position at a rate dependent upon the rate of rotation of the shaft 2, that is, at a rate dependent upon the rate of flow of fluid or other commodity through meter M. It follows that the angular movement of the stylus 7, and, consequently, the length of the line traced by this stylus on the chart 25, is proportional to the amount of fluid or current consumed during the time interval between successive release of the stylus.

Although I have herein shown and described only one form of demand meter embodying my invention, it is understood that various changes and modifications may be made therein within the scope of the appended claims without departing from the spirit and scope of my invention.

Having thus described my invention, what I claim is:

1. In a demand meter, a circular rotatable chart-supporting plate provided with a circular rack on its rear face, a shaft carrying a disk so located that its periphery lies between two teeth in said rack and having on its outer edge a transversely offset portion which shifts said plate an angular distance of one tooth for each revolution of said disk, a chart attached to said plate, a stylus cooperating with said chart and biased to the zero position thereon, a gear wheel constantly connected with said stylus, a trip lever pivotally mounted on an axis perpendicular to the axis of said gear wheel and biased to a normal position, a shaft journalled in said trip lever and having its axis perpendicular to the axis of said gear wheel, a worm fixed to said shaft and meshing with said gear wheel when said trip lever is in its normal position, a cam on said first named shaft for periodically swinging said trip lever away from its normal position to disengage said worm from said gear wheel, and a constantly operating motor for rotating the shaft carrying said disk and said cam.

2. In a demand meter, a pivoted chart-supporting plate having a circular rack on its rear face, a shaft arranged adjacent said rack and parallel with the plane of said plate, a disk secured to said shaft having the peripheral rim thereof engaging the teeth of said circular rack, a notch and an offset portion in the rim of said disk, and means to drive said shaft and the disk secured thereto whereby said chart-supporting plate is intermittently rotated as said offset portion engages a tooth of the rack thereof.

In testimony whereof I affix my signature.

HORACE CHRISMAN.